United States Patent
Bahena et al.

(10) Patent No.: US 9,031,745 B2
(45) Date of Patent: May 12, 2015

(54) SYSTEMS AND METHODS FOR CORRECTING STEERING WHEEL ANGLE ERRORS

(71) Applicant: Ford Global Technologies, LLC, Dearborn, MI (US)

(72) Inventors: Miguel Bahena, Dearborn, MI (US); Attila Benak, Cologne (DE); Andrew Brown, Canton, MI (US); Sergio Condonesu, Heerlen (NL); Darrel Alan Recker, Ypsilanti, MI (US); Lodewijk Wijffels, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/154,994

(22) Filed: Jan. 14, 2014

(65) Prior Publication Data
US 2014/0200770 A1    Jul. 17, 2014

(30) Foreign Application Priority Data
Jan. 15, 2013   (DE) .......................... 10 2013 200 451

(51) Int. Cl.
  *B62D 15/00*  (2006.01)
  *B62D 6/10*   (2006.01)
  *B62D 6/00*   (2006.01)
  *B62D 15/02*  (2006.01)

(52) U.S. Cl.
CPC  *B62D 6/10* (2013.01); *B62D 6/002* (2013.01); *B62D 6/008* (2013.01); *B62D 15/024* (2013.01)

(58) Field of Classification Search
None
See application file for complete search history.

(56) References Cited

U.S. PATENT DOCUMENTS

| | | | | |
|---|---|---|---|---|
| 5,438,515 A * | 8/1995 | Miichi et al. | | 701/36 |
| 5,964,814 A * | 10/1999 | Muller et al. | | 701/41 |
| 6,079,513 A * | 6/2000 | Nishizaki et al. | | 180/402 |
| 6,082,482 A * | 7/2000 | Kato et al. | | 180/402 |
| 6,336,519 B1 * | 1/2002 | Bohner et al. | | 180/403 |
| 6,415,215 B1 * | 7/2002 | Nishizaki et al. | | 701/70 |
| 6,474,436 B1 * | 11/2002 | Konigorski | | 180/402 |
| 6,655,490 B2 * | 12/2003 | Andonian et al. | | 180/402 |

(Continued)

FOREIGN PATENT DOCUMENTS

| | | |
|---|---|---|
| DE | 10302559 A1 | 9/2004 |
| DE | 10200400981 A1 | 9/2005 |

(Continued)

OTHER PUBLICATIONS

Examination Report issued in corresponding German Patent Application No. 102013200451.6, dated Aug. 20, 2013.

(Continued)

*Primary Examiner* — Jonathan M Dager
(74) *Attorney, Agent, or Firm* — Jones Robb, PLLC; Raymond L. Coppiellie

(57) ABSTRACT

A system for correcting steering wheel angle errors of a motor vehicle of the present disclosure may include a steering wheel angle sensor, an actuator angle sensor, and at least one of a wheel speed sensor and a lateral acceleration sensor. The system may further include a controller configured to receive signals from the steering wheel angle sensor, actuator angle sensor, and at least one of the wheel speed sensor and lateral acceleration sensor. The controller may be configured to calculate a correction angle based on the signals, and adjust a steering wheel angle of a steering wheel, as observed by a driver of the motor vehicle, based on the correction angle.

20 Claims, 2 Drawing Sheets

(56) References Cited

U.S. PATENT DOCUMENTS

| | | | |
|---|---|---|---|
| 7,100,733 B2 * | 9/2006 | Zhao | 180/402 |
| 7,143,864 B2 * | 12/2006 | Mattson et al. | 180/446 |
| 7,810,605 B2 * | 10/2010 | Kasahara et al. | 180/402 |
| 7,881,841 B2 * | 2/2011 | Dattilo et al. | 701/42 |
| 8,090,503 B2 * | 1/2012 | Lavoie et al. | 701/42 |
| 8,489,280 B2 * | 7/2013 | Wittig et al. | 701/41 |
| 8,660,754 B2 * | 2/2014 | Kristensen et al. | 701/42 |
| 8,798,865 B1 * | 8/2014 | Raad et al. | 701/42 |
| 2002/0157893 A1 * | 10/2002 | Pauly et al. | 180/402 |
| 2003/0212476 A1 * | 11/2003 | Aanen et al. | 701/1 |
| 2004/0094351 A1 * | 5/2004 | Higashi et al. | 180/402 |
| 2004/0138796 A1 * | 7/2004 | Yao et al. | 701/41 |
| 2005/0096830 A1 * | 5/2005 | Ohta et al. | 701/91 |
| 2006/0042859 A1 * | 3/2006 | Itoh | 180/402 |
| 2006/0129294 A1 * | 6/2006 | Moser et al. | 701/41 |
| 2008/0015762 A1 * | 1/2008 | Lu et al. | 701/70 |
| 2008/0196966 A1 * | 8/2008 | Maruyama et al. | 180/446 |
| 2009/0024293 A1 * | 1/2009 | Takenaka et al. | 701/71 |
| 2010/0004825 A1 * | 1/2010 | Nakano et al. | 701/42 |
| 2011/0202239 A1 * | 8/2011 | Maruyama et al. | 701/41 |
| 2011/0218700 A1 * | 9/2011 | Mori et al. | 701/29 |
| 2012/0101687 A1 * | 4/2012 | Svensson et al. | 701/42 |
| 2014/0014433 A1 * | 1/2014 | Kageyama et al. | 180/402 |

FOREIGN PATENT DOCUMENTS

| | | |
|---|---|---|
| DE | 10200404849 A1 | 11/2005 |
| DE | 102007001965 A1 | 7/2007 |

OTHER PUBLICATIONS

Abstract of EP156877A2, dated Aug. 31, 2005.

* cited by examiner

SYSTEMS AND METHODS FOR CORRECTING STEERING WHEEL ANGLE ERRORS

CROSS REFERENCE TO RELATED APPLICATIONS

This application claims priority to German Application No. 102013200451.6, filed on Jan. 15, 2013, the entire content of which is incorporated by reference herein. This application is related to German Application No. 102014200100.5, filed on Jan. 8, 2014, the entire content of which is incorporated by reference herein.

TECHNICAL FIELD

The present disclosure relates generally to systems and methods for correcting steering wheel angle errors. In particular, the present disclosure relates to systems and methods for correcting steering wheel angle errors in an active steering system of a motor vehicle.

BACKGROUND

Active steering systems may continuously and intelligently alter the relationship between a driver's steering inputs at the steering wheel and the angle of the steered road wheels of the vehicle. An active steering system, for example, varies the degree that the road wheels turn in response to rotation of the steering wheel via a mechatronic auxiliary system. At lower speeds, this technology may reduce the amount that the steering wheel must be turned (improving performance in situations such as parking and other urban area traffic maneuvers), and at higher speeds, the system helps to prevent increased steering responsiveness resulting from increased speeds (providing improved direction of stability).

Examples of active steering systems include, but are not limited to, a steer-by-wire system, in which there is no mechanical connection between the steering wheel and the steering of the road wheels, and a superimposed steering system, in which the steering angle that is generated at the steering wheel by the driver is superimposed on a steering angle generated by a servo motor, in a superimposition gear mechanism, and the sum of the two steering angles is transmitted to the steering of the road wheels. Such active steering systems provide various advantages, including, for example, the ability to change the angle of the steered road wheels without the intervention being directly perceptible to the driver. This may be accomplished, for example, by eliminating the coupling of the steering wheel actuation angle and steering angle, in particular to select a transmission ratio between the steering wheel and the steering of the road wheels as a function of the speed, which may increase driving comfort and safety.

Active steering systems may, however, create a situation in which the steering wheel is not necessarily in the center position, and appears to be rotated to the driver of the vehicle, when the motor vehicle is traveling straight ahead. Sources for such visible offsets may include, for example, production deviations, faulty steering wheel settings or steering system settings, and/or wear or damage to the vehicle. Furthermore, uneven roads, with a changing road crown, may also lead to visible offsets between the straight-ahead orientation of the motor vehicle and the center position of the steering wheel. Such deviations may adversely affect the comfort of the driver.

It may, therefore, be advantageous for active steering systems to have knowledge of misalignments between the steering wheel and the road wheels, and be able to correct such steering wheel offsets to make the steering wheel look straight when the vehicle is driving straight.

SUMMARY

In accordance with various exemplary embodiments, the present disclosure provides a system and method for correcting steering wheel angle errors of a motor vehicle. In accordance with various embodiments of the present disclosure, a system for correcting steering wheel angle errors of a motor vehicle may include a steering wheel angle sensor, an actuator angle sensor, and at least one of a wheel speed sensor and a lateral acceleration sensor. The system may further include a controller configured to receive signals from the steering wheel angle sensor, actuator angle sensor, and at least one of the wheel speed sensor and lateral acceleration sensor. The controller may be configured to calculate a correction angle based on the signals, and adjust a steering wheel angle of a steering wheel, as observed by a driver of the motor vehicle, based on the correction angle.

In accordance with various additional embodiments of the present disclosure, a method for correcting steering wheel angle errors of a motor vehicle may include receiving a signal corresponding to a steering wheel angle of a steering wheel of the motor vehicle and receiving a signal corresponding to an actuator angle generated by an active steering system. The method my also comprise estimating a compensated steering wheel angle. The method may further comprise calculating a correction angle based on the steering wheel angle, the actuator angle, and the compensated steering wheel angle.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
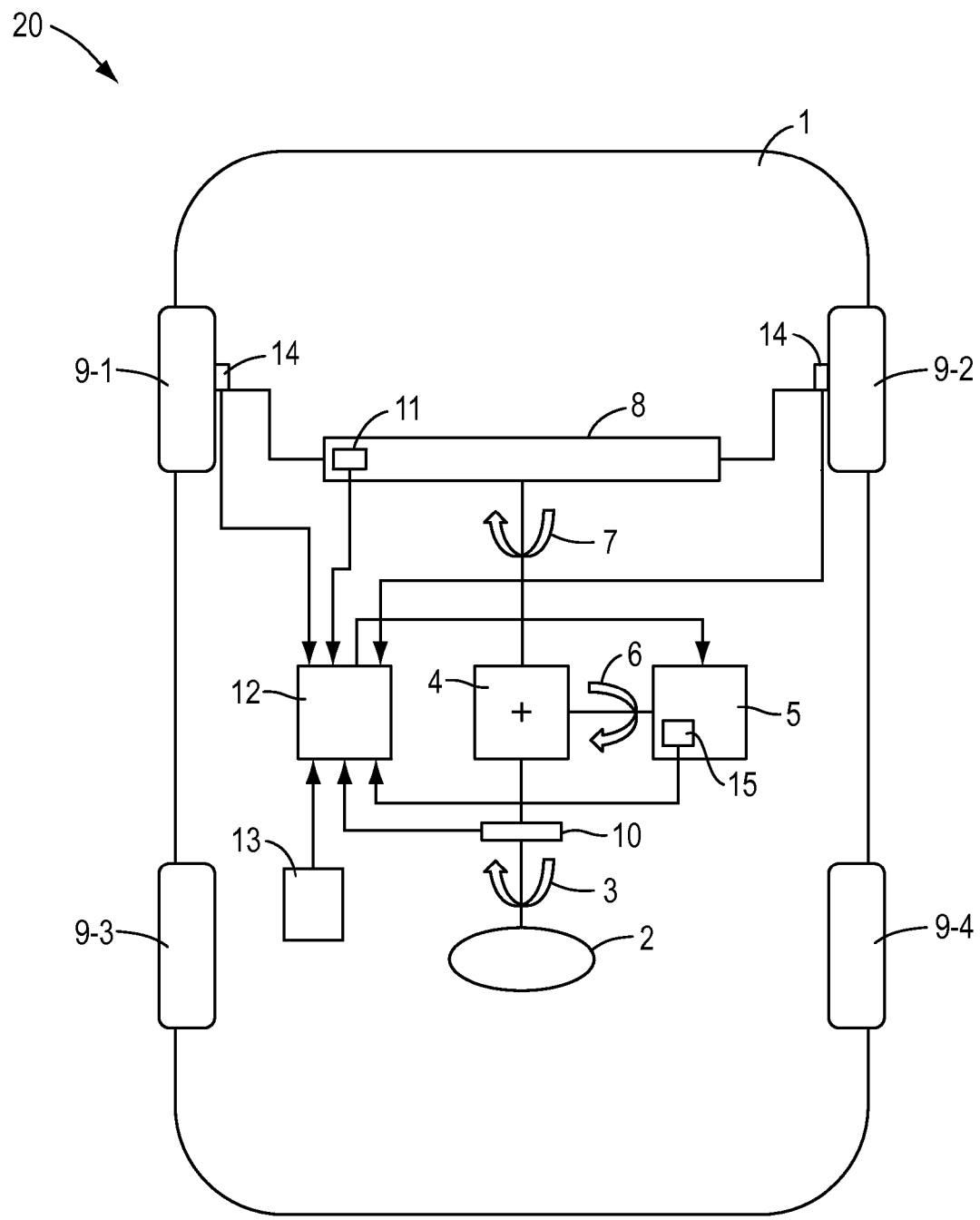
FIG. 1 is a schematic diagram showing the structure of an exemplary embodiment of a system for correcting steering wheel angle errors in accordance with the present disclosure.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents.

An active steering system, such as, for example, Active Front Steering (AFS) provides an electronically controlled superposition of an angle to the steering wheel angle provided by the driver of the vehicle. This additional degree of freedom enables a continuous and driving-situation dependent adaptation of the steering characteristics of the vehicle. In various situations, however, such systems may cause visible offsets between the steering wheel/angle of the steering wheel, as observed by the driver of the vehicle, and the direction of motion of the vehicle. Notably, when the vehicle is traveling relatively straight, the steering wheel may still appear to the driver to be slightly rotated and have a slight angle. To enable correction of such offsets, the systems and methods of the present disclosure contemplate calculating a correction angle that represents the deviation between the actual steering wheel angle and the vehicle's forward motion angle, and adjusting the steering wheel angle, as observed by the driver, based on the correction angle, until the deviation is corrected.

In various embodiments, for example, adjusting a steering wheel angle of a steering wheel, as observed by a driver of the vehicle, comprises re-aligning or re-orienting the steering wheel until the steering wheel appears to be straight to the driver.

Various exemplary embodiments of the present disclosure contemplate using various vehicle sensors to provide signals to a controller, which utilizes the signals to calculate the correction angle. The vehicle sensors may include existing vehicle sensors when available, such as, for example, active steering sensors, such as, for example AFS sensor(s), antilock brake system (ABS) sensor(s), steering wheel angle sensors, wheel speed sensors, lateral acceleration sensors, and an actuator angle sensor, a pinion angle sensor, or any combination thereof. Because most existing vehicles already contain the above sensors, certain embodiments of the present disclosure contemplate using only existing sensors. Embodiments of the present disclosure also contemplate systems and methods that include and utilize additional sensors as needed to provide the signal inputs used in the systems and methods of the present disclosure.

To calculate the correction angle, the present disclosure allows for a compensated steering wheel angle provided by the active steering system. In various embodiments, for example, to calculate the correction angle, the present disclosure contemplates estimating the compensated steering wheel angle and subtracting both the compensated steering wheel angle and an actuator angle (which is measured at the active steering actuator) from the actual steering wheel angle (which is measured at the steering wheel).

In accordance with various embodiments, the present disclosure contemplates estimating the compensated steering wheel angle based on a direction of movement of the motor vehicle. As used herein, the term "direction of movement," and variations therefore, refers to the direction at which the vehicle is traveling with respect to a zero degree heading. In other words, a vehicle has a heading of zero degrees when the vehicle is driving straight, a positive heading (between 0 and 180 degrees) when turning in the counterclockwise direction, and a negative heading (between 0 and −180 degrees) when turning in the clockwise direction. Thus, the direction of movement is the angle at which the vehicle is heading (the forward motion angle of the vehicle).

In various embodiments of the present disclosure, the direction of movement of the vehicle may be determined by comparing the respective wheel speeds of two or more wheels of the vehicle. For example, the wheel speeds of the wheels on one of the axles of the vehicle (i.e., the front wheels or the back wheels) may be compared to determine the direction of movement. In the case of front axle steering, utilized with AFS systems, the wheel speeds of the left-hand and right-hand front wheels may be compared to determine the direction of movement. Those of ordinary skill in the art would understand, however, that the wheel speeds of various wheel combinations may be compared to determine the direction of movement of the vehicle without departing from the scope of the present disclosure and claims.

The direction of movement of the motor vehicle may also be directly determined via a sensor, such as, for example, a lateral acceleration sensor. Although the use of such a sensor may increase the structural complexity of the determination, it provides the added advantage of supplying a measured value that is independent of deviations created by different tire pressures or different degrees of tire wear between the compared wheels (which may affect the wheel circumference of the compared wheels). To increase the accuracy of the direction of motion determination, various embodiments of the present disclosure, therefore, contemplate using a sensor in addition to evaluating the wheel speeds, and comparing the two determined values against one another.

Those of ordinary skill in the art would understand that the above described methods for determining the direction of movement of the motor vehicle are exemplary only, and that any method and/or technique known to those of ordinary skill in the art may be used to determine the direction of motion of the vehicle without departing from the scope of the present disclosure and claims.

Furthermore, the present disclosure contemplates using any method and/or technique known to those of ordinary skill in the art to calculate the compensated steering wheel angle, including but not limited to the direction of motion of the motor vehicle.

FIG. 1 shows the structure of an exemplary embodiment of a system 20 for correcting steering wheel angle errors in accordance with the present disclosure. A motor vehicle 1 includes an active steering system, such as, for example, an Active Front Steering (AFS) system (shown by individually labeled components). In use, a driver of the motor vehicle 1 may control the direction of motion of the motor vehicle 1 via a steering wheel 2, thereby deflecting the steering wheel 2 by a steering wheel angle 3. The AFS system includes a superimposition gear mechanism 4, which superimposes a superimposition angle 6 (i.e., an actuator angle) on the steering wheel angle 3 via an actuator, such as, for example, an electric motor 5. A resulting total actuation angle 7 (i.e., compensated steering angle), which includes the steering wheel angle 3 and the superimposition angle 6, moves a steering gear 8, which moves two of the wheels 9-1, 9-2, 9-3, 9-4 into a desired position. As shown in the embodiment of FIG. 1, in a vehicle having front axle steering, the compensated steering angle 7 will move the steering gear 8 to move the front wheels 9-1, 9-2 of the vehicle 1.

In various embodiments of the present disclosure, the system 20 for correcting steering wheel angle errors includes various preexisting vehicle sensors embodied within various subsystems of the vehicle 1, and a controller 12 that is configured to receive signals from the sensors and calculate a correction angle based on the signals. In various embodiments, for example, the active steering system includes a steering wheel angle sensor 10 that may detect the steering wheel angle 3, an actuator angle sensor 15 that may detect the superimposition angle 6, and a pinion angle sensor 11.

The system 20 may further include various additional sensors used to determine a direction of motion of the vehicle 1, including, for example, wheel speed sensors 14 associated with each of the front wheels 9-1, 9-2 of the vehicle 1 and/or a lateral acceleration sensor 13. Such sensors may be present in various additional subsystems of the vehicle 1, including, for example, the ABS system (not shown).

Those of ordinary skill in the art would understand that the system 20 for correcting steering wheel angle errors illustrated in FIG. 1 is exemplary only and intended to illustrate one embodiment of the present disclosure. Accordingly, systems and vehicles encompassing such systems in accordance with the present disclosure may have various types, numbers and/or configurations of actuators, controllers, and/or sensors without departing from the scope of the present disclosure and claims. For example, although the system 20 illustrated and described with reference to FIG. 1 includes an AFS system, embodiments of the present disclosure contemplate correcting the steering wheel angle in conjunction with any type and/or configuration of active steering system.

As shown in FIG. 1, the controller 12 receives signals from the steering wheel angle sensor 10, the actuator angle sensor 15, and at least one of the wheel speed sensors 14 and the lateral acceleration sensor 13 and calculates a correction angle based on the signals, as set forth in the following exemplary embodiments. The controller 12 may include, for example, an existing vehicle controller such as the Electronic Control Unit (ECU) of the vehicle 1, or a dedicated controller, or control may be distributed among more than one vehicle controller, as would be understood by one ordinarily skilled in the art.

As above, to calculate the correction angle, in various embodiments, the controller 12 is configured to estimate a compensated steering wheel angle based on the direction of movement of the motor vehicle 1. The controller 12 may then calculate the correction angle based on the steering wheel angle 3, the superimposition angle 6, and the estimated compensated steering wheel angle, for example, by subtracting both the superimposition angle 6 and compensated steering wheel angle from the steering wheel angle 3. This correction angle represents a deviation angle between the current steering wheel angle 3 and the direction of motion of the motor vehicle 1, which may be stored, for example, in a memory (not shown), associated with the controller 12.

The controller 12 may then adjust the steering wheel angle 3 (e.g., via the AFS system) based on the stored correction angle. In various embodiments, for example, the controller 12 may continuously calculate and store a correction angle, and incrementally adjust the steering wheel angle 3 until the calculated correction angle equals zero degrees (i.e., until the deviation is fully corrected). For example, to prevent the driver of the vehicle 1 from noticing that the system 20 is correcting the steering wheel angle 3, in various embodiments, the controller 12 is configured to slowly adjust the steering wheel angle 3 over a given period of time by applying an additional steering wheel angle that is less than or equal to the calculated correction angle. In various additional embodiments, the controller 12 is configured to quickly adjust the steering wheel angle 3 by applying an additional steering wheel angle that is equal to the calculated correction angle.

In various additional embodiments, as described in more detail with reference to FIG. 2, it may be necessary to limit when the controller 12 implements a correction (i.e., adjusts the steering wheel angle 3) to a pre-established correction window. As would be understood by those of ordinary skill in the art, since the calculated correction angle is based on an estimated compensated steering wheel angle (which is dependent on dynamic vehicle characteristics), it may only be appropriate to use the estimate under a certain set of conditions, which are defined by a correction window. Accordingly, prior to implementing a correction, the controller 12 may be further configured to determine a correction state of the vehicle 1 to determine whether or not the conditions to adjust the steering wheel angle 3 have been met (are within the correction window). In other words, the correction window defines a set of vehicle characteristics, which assume normal driving conditions, wherein a period of travel of the vehicle 1 is not ending. In various embodiments, for example, the controller 12 is configured to adjust the steering wheel angle 3 only when a speed of the vehicle 1 is within a predefined threshold, the compensated steering wheel angle of the vehicle 1 is below a predetermined threshold, and a steering wheel velocity of the vehicle 1 is below a predetermined threshold. In various embodiments of the present disclosure, the controller 12 is configured to adjust the steering wheel angle 3 only when: (1) the speed of the vehicle 1 is between about 10 kilometers per hour (kph) and about 250 kph, (2) the compensated steering wheel angle is less than about 15001 degrees (an absolute value corresponding to about one and half turns of the steering wheel), and (3) the steering wheel velocity is less than about 12001 degrees (an absolute value corresponding to the drivers steering rate).

Figure 2:
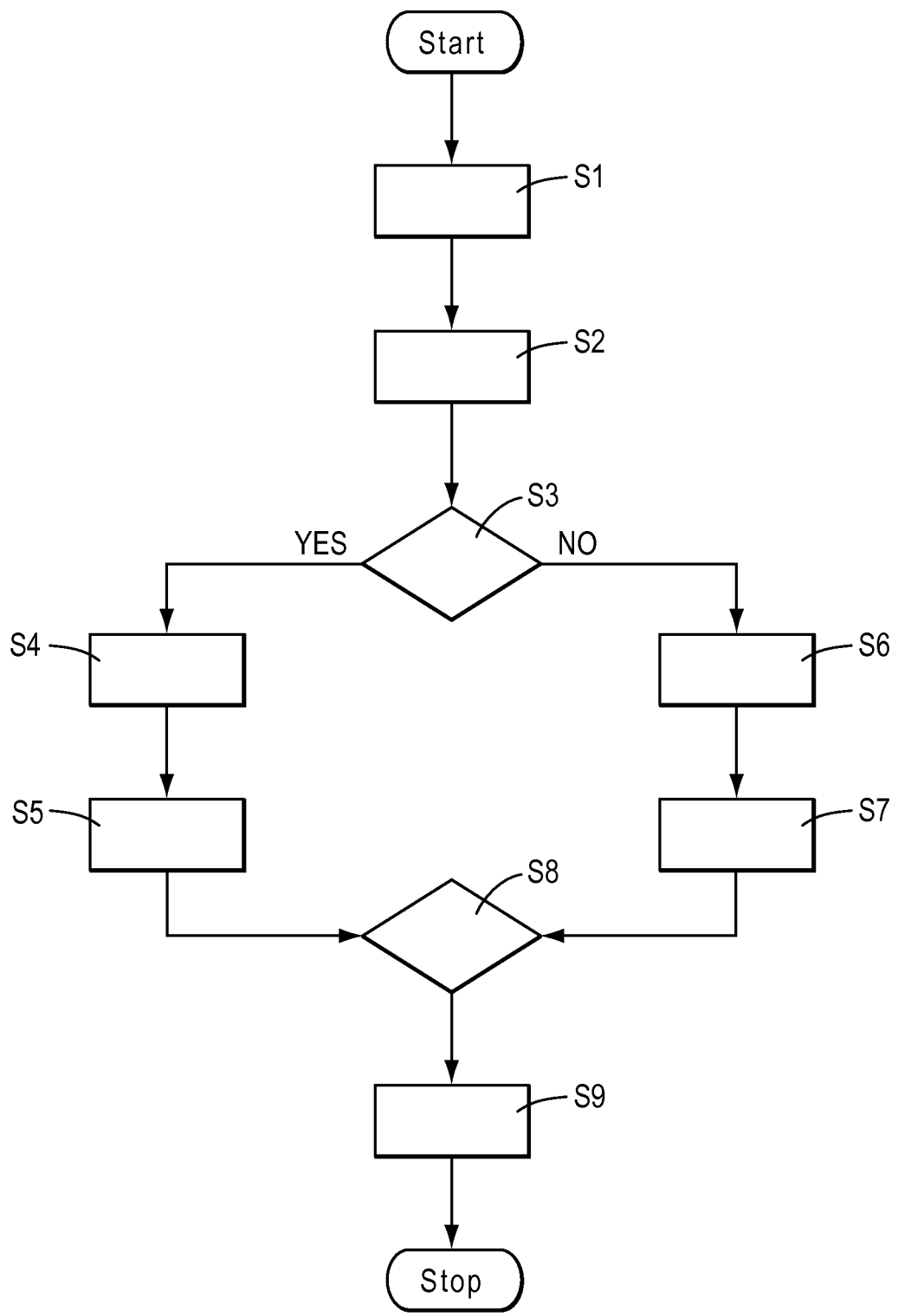
FIG. 2 is a flow chart illustrating an exemplary embodiment of a method for correcting steering wheel angle errors in accordance with the present disclosure.

FIG. 2 shows a flow diagram depicting an exemplary embodiment of a method for correcting steering wheel angle errors in accordance with the present disclosure. As illustrated in FIG. 2, the method begins when a vehicle, such as, for example, the vehicle 1 of FIG. 1, including the above described system 20, is started; and ends, for example, when the vehicle 1 is turned off. The method may be, for example, cyclical and constantly run as the vehicle is driven.

At step S1, a continuous determination of the deviation of the steering wheel angle is carried out via a continuous calculation (and storing) of a correction angle as described above. In various embodiments, for example, at step S1, a controller 12 may receive signals corresponding to various vehicle characteristics, including, but not limited to, a steering wheel angle 3 and an actuator angle (e.g., a superimposition angle 6). The controller 12 may then estimate a compensated steering wheel angle, and calculate the correction angle based on the steering wheel angle 3, the superimposition angle 6, and the compensated steering wheel angle.

In step S2, the controller 12 determines a correction state of the vehicle 1. In various embodiments, for example, the controller 12 may determine the correction state via the vehicle speed, the steering speed, and the yaw rate. In various additional embodiments, the controller 12 may also use the previously calculated compensated steering wheel angle to determine the correction state. In step S3, the controller 12 determines whether or not the correction state is within a pre-established correction window. If the correction state of the vehicle 1 is within the correction window, the process continues with step S4. If the correction state of the vehicle 1 is outside the correction window, the process branches to step S6.

At step S4, the controller 12 reduces the deviation angle (represented by the correction angle) between the steering wheel angle 3 and the direction of movement of the vehicle 1.

In step S5, the correction angle is correspondingly updated to reflect the adjustment. If the correction state of the vehicle 1 is outside the correction window, at step S6, the controller 12 is prohibited from updating the correction angle. Consequently, in step S7, the previous correction angle is frozen and stored by the controller 12. In step S8, the results of steps S5 and S7 are combined and the correspondingly appropriate correction angle is applied in S9 to adjust the steering wheel angle 3.

As above, to prevent the driver of the vehicle 1 from noticing that the system 20 is adjusting the steering wheel angle 3, in various embodiments, the controller 12 may slowly adjust the steering wheel angle 3 over a given period of time by repetitively running through the above process and applying an additional steering wheel angle that is less than or equal to the correction angle at step S9 until the deviation is corrected. In various additional embodiments, the controller 12 may quickly adjust the steering wheel angle 3 by applying an additional steering wheel angle that is equal to the correction angle at step S9.

While the present disclosure has been disclosed in terms of exemplary embodiments in order to facilitate better understanding of the present disclosure, it should be appreciated that the present disclosure can be embodied in various ways without departing from the principle of the disclosure. Accordingly, while the present disclosure has been disclosed in terms of using an AFS system with a single controller, the disclosure as disclosed works equally well for various quantities and types of controllers and/or microprocessors. For example, the present disclosure additionally contemplates multiple controllers configured to estimate the compensated steering wheel angle, calculate the correction angle, and adjust the steering wheel angle. Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A system for correcting steering wheel angle errors of a motor vehicle, the system comprising:
    a steering wheel angle sensor, an actuator angle sensor, and at least one of a wheel speed sensor and a lateral acceleration sensor; and
    a controller configured to receive signals from the steering wheel angle sensor, actuator angle sensor, and at least one of the wheel speed sensor and lateral acceleration sensor,
    wherein the controller is configured to calculate a correction angle based on the signals, and adjust a steering wheel angle of a steering wheel, as observed by a driver of the motor vehicle, based on the correction angle.

2. The system of claim 1, wherein the controller is configured to estimate a compensated steering wheel angle.

3. The system of claim 2, wherein the controller is configured to estimate the compensated steering wheel angle based on a direction of movement of the motor vehicle.

4. The system of claim 3, wherein the controller is configured to determine the direction of movement based on the lateral acceleration of the vehicle.

5. The system of claim 2, wherein the controller is configured to calculate the correction angle based on a steering wheel angle, the compensated steering wheel angle, and an actuator angle.

6. The system of claim 5, wherein the actuator angle includes a superposition angle provided by an active front steering system.

7. The system of claim 1, wherein the correction angle represents a deviation angle between the steering wheel angle and the direction of movement of the motor vehicle.

8. The system of claim 1, wherein the controller incrementally adjusts the steering wheel angle until the correction angle equals zero degrees.

9. The system of claim 1, wherein the controller is configured to adjust the steering wheel angle by applying an additional steering wheel angle via an active steering system of the motor vehicle.

10. A system for correcting steering wheel angle errors of a motor vehicle, the system comprising:
    a steering wheel angle sensor, an actuator angle sensor, and at least one of a wheel speed sensor and a lateral acceleration sensor; and
    a controller configured to receive signals from the steering wheel angle sensor, actuator angle sensor, and at least one of the wheel speed sensor and lateral acceleration sensor,
    wherein the controller is configured to calculate a correction angle based on the signals, and adjust a steering wheel angle of a steering wheel, as observed by a driver of the motor vehicle, based on the correction angle,
    wherein the controller is configured to estimate a compensated steering wheel angle based on a direction of movement of the motor vehicle, and
    wherein the controller is configured to determine the direction of movement based on a speed of one more or more wheels of the vehicle.

11. A method for correcting steering wheel angle errors of a motor vehicle, the method comprising:
    receiving a signal corresponding to a steering wheel angle of a steering wheel of the motor vehicle;
    receiving a signal corresponding to an actuator angle generated by an active steering system;
    estimating a compensated steering wheel angle; and calculating a correction angle based on the steering wheel angle, the actuator angle, and the compensated steering wheel angle.

12. The method of claim 11, wherein estimating the compensated steering wheel angle comprises determining a direction of movement of the motor vehicle.

13. The method of claim 12, wherein determining the direction of movement comprises receiving a signal from one or more vehicle sensors.

14. The method of claim 11, wherein calculating the correction angle comprises subtracting the actuator angle and the compensated steering wheel angle from the measured steering wheel angle.

15. The method of claim 11, further comprising adjusting the steering wheel angle based on the calculated correction angle.

16. The method of claim 15, wherein adjusting the steering wheel angle comprises incrementally adjusting the steering wheel angle over a period of time until the calculated correction angle equals zero degrees.

17. The method of claim 15, wherein adjusting the steering wheel angle comprises adjusting the steering wheel angle by an angle less than or equal to the correction angle.

18. The method of claim 15, wherein adjusting the steering wheel angle comprises applying an additional steering wheel angle to the active steering system.

19. A method for correcting steering wheel angle errors of a motor vehicle, the method comprising:
    receiving a signal corresponding to a steering wheel angle of a steering wheel of the motor vehicle;
    receiving a signal corresponding to an actuator angle generated by an active steering system;
    estimating a compensated steering wheel angle; and
    calculating a correction angle based on the steering wheel angle, the actuator angle, and the compensated steering wheel angle,
    wherein estimating the compensated steering wheel angle comprises determining a direction of movement of the motor vehicle, and
    wherein determining the direction of movement comprises comparing respective wheel speeds of two more wheels of the motor vehicle.

20. A method for correcting steering wheel angle errors of a motor vehicle, the method comprising:
    receiving a signal corresponding to a steering wheel angle of a steering wheel of the motor vehicle;
    receiving a signal corresponding to an actuator angle generated by an active steering system;
    estimating a compensated steering wheel angle;
    calculating a correction angle based on the steering wheel angle, the actuator angle, and the compensated steering wheel angle;
    determining a correction state of the motor vehicle; and
    adjusting the steering wheel angle based on the calculated correction angle when the correction state is within a pre-established window.

\* \* \* \* \*